United States Patent
Ma et al.

(10) Patent No.: US 12,000,222 B2
(45) Date of Patent: Jun. 4, 2024

(54) PRESSURE COMPENSATION DEVICE WITH ACCUMULATOR GROUP FOR CONTROLLED PRESSURE DRILLING

(71) Applicants: CNPC BOHAI DRILING ENGINEERING COMPANY LIMITED, Tianjin (CN); CHINA NATIONAL PETROLEUM CORPORATION, Beijing (CN); CHINA UNIVERSITY OF PETROLEUM (EAST CHINA), Shandong (CN)

(72) Inventors: Jinshan Ma, Tianjin (CN); Baojiang Sun, Shandong (CN); Jintao Qi, Tianjin (CN); Liming Wei, Tianjin (CN); Fengliang Xi, Tianjin (CN); Gang Liu, Tianjin (CN); Zhiyuan Wang, Shandong (CN); Xing Wang, Tianjin (CN); Haichao Xu, Tianjin (CN); Long Ma, Tianjin (CN); Jiacui Luan, Tianjin (CN); Lei Chen, Tianjin (CN); Guodong Chen, Tianjin (CN); Yuanlin Zhao, Tianjin (CN); Zisen Yang, Tianjin (CN); Qiang Huang, Tianjin (CN); Menglei Ma, Tianjin (CN); Xiantao Meng, Tianjin (CN); Hongyin Wei, Tianjin (CN)

(73) Assignees: CNPC BOHAI DRILING ENGINEERING COMPANY LIMITED, Tianjin (CN); CHINA NATIONAL PETROLEUM CORPORATION, Beijing (CN); CHINA UNIVERSITY OF PETROLEUM (EAST CHINA), Shandong (CN)

( * ) Notice: Subject to any disclaimer, the term of this patent is extended or adjusted under 35 U.S.C. 154(b) by 193 days.

(21) Appl. No.: 17/767,929

(22) PCT Filed: Sep. 7, 2020

(86) PCT No.: PCT/CN2020/113686
§ 371 (c)(1),
(2) Date: Apr. 11, 2022

(87) PCT Pub. No.: WO2021/068694
PCT Pub. Date: Apr. 15, 2021

(65) Prior Publication Data
US 2023/0228162 A1    Jul. 20, 2023

(30) Foreign Application Priority Data

Oct. 11, 2019  (CN) .......................... 201910961602.6

(51) Int. Cl.
*E21B 21/08*    (2006.01)
*E21B 21/01*    (2006.01)
(Continued)

(52) U.S. Cl.
CPC .............. *E21B 21/08* (2013.01); *E21B 21/01* (2013.01); *E21B 21/106* (2013.01); *E21B 34/16* (2013.01);
(Continued)

(58) Field of Classification Search
CPC ........ E21B 21/08; E21B 21/106; E21B 34/16; F15B 1/02; F15B 1/021; F15B 1/027; F15B 1/04
See application file for complete search history.

(56) References Cited

U.S. PATENT DOCUMENTS

| | | |
|---|---|---|
| 9,885,221 B2 | 2/2018 | Baugh |
| 2013/0036800 A1* | 2/2013 | Mohajer ................... F17D 3/10 73/61.59 |

(Continued)

FOREIGN PATENT DOCUMENTS

| | | | |
|---|---|---|---|
| CN | 201568042 | | 9/2010 |
| CN | 201568042 U | * | 9/2010 |

(Continued)

OTHER PUBLICATIONS

"International Search Report (Form PCT/ISA/210) of PCT/CN2020/113686," mailed on Dec. 2, 2020, with English translation thereof, pp. 1-6.

*Primary Examiner* — Atif H Chaudry
(74) *Attorney, Agent, or Firm* — JCIPRNET

(57) ABSTRACT

A pressure compensation device with an accumulator group for controlled pressure drilling includes an electrical flat
(Continued)

valve, a check valve, an accumulator group, a flanged pup joint and a support base. The electrical flat valve is connected to the check valve and is mounted on a top surface of the support base. The accumulator group mounted on the whole support base is a pre-storage pressure compensation device for controlled pressure drilling, and is located at a downstream position of the check valve. The liquid inlet end of the accumulator group is connected to the check valve, and the liquid discharge end is connected to the flanged pup joint.

2 Claims, 4 Drawing Sheets

(51) Int. Cl.
| | |
|---|---|
| *E21B 21/10* | (2006.01) |
| *E21B 34/16* | (2006.01) |
| *F15B 1/02* | (2006.01) |
| *F15B 1/027* | (2006.01) |
| *F15B 1/04* | (2006.01) |
| *G05D 16/16* | (2006.01) |

(52) U.S. Cl.
CPC ............... *F15B 1/02* (2013.01); *F15B 1/021* (2013.01); *F15B 1/027* (2013.01); *F15B 1/04* (2013.01); *G05D 16/16* (2013.01)

(56) References Cited

U.S. PATENT DOCUMENTS

| | | |
|---|---|---|
| 2016/0040500 A1 | 2/2016 | Hilpert et al. |
| 2016/0237788 A1 | 8/2016 | Cenac |
| 2018/0163519 A1* | 6/2018 | O'Donnell ............ E21B 43/017 |
| 2019/0153821 A1 | 5/2019 | Douglas et al. |
| 2021/0108494 A1* | 4/2021 | Cook .................. F16K 11/0876 |

FOREIGN PATENT DOCUMENTS

| | | | |
|---|---|---|---|
| CN | 202157795 | | 3/2012 |
| CN | 203271711 U | * | 11/2013 |
| CN | 203702123 | | 7/2014 |
| CN | 208858329 | | 5/2019 |
| CN | 110630194 | | 12/2019 |

* cited by examiner

PRESSURE COMPENSATION DEVICE WITH ACCUMULATOR GROUP FOR CONTROLLED PRESSURE DRILLING

CROSS-REFERENCE TO RELATED APPLICATION

This application is a 371 of international application of PCT application serial no. PCT/CN2020/113686 filed on Sep. 7, 2020 which claims the priority benefit of China application no. 201910961602.6, filed on Oct. 11, 2019. The entirety of each of the above mentioned patent applications is hereby incorporated by reference herein and made a part of this specification.

TECHNICAL FIELD

The invention relates to the controlled pressure drilling technology, in particular to a pressure compensation device with an accumulator group for controlled pressure drilling.

DESCRIPTION OF RELATED ART

During the drilling process, the downhole pressure may be out of balance in pressure-sensitive well sections, which in turn causes a series of complicated downhole problems such as wall stripping and collapsing, overflowing and solids settling sticking, prolonging the non-drilling time, increasing the drilling cost, and even threatening the drilling safety. The controlled pressure drilling technology is put forward to solve these problems.

The controlled pressure drilling technology aims to fulfill the control objectives of keeping the bottom pressure within a set pressure range by setting the annular pressure in advance and accurately controlling the annular pressure of an entire well between the formation pore pressure and the fracture pressure by means of comprehensive analysis of drilling parameters including the wellhead back pressure, the drilling fluid density, the annular liquid level, the circulating pressure loss and the geometric dimensions of the well and accurate hydraulic calculation. Dynamic control of the annular pressure is realized by combining the controlled pressure drilling equipment and technology and the computer-based automatic control system.

According to the existing controlled pressure drilling technology, a slurry pump on a drilling rig or an independent back pressure pump is generally used as a power source to provide the wellhead back pressure and is always in a standby state, and after drilling fluid in the shaft stops circulating, the slurry pump or the back pressure pump is started to generate the wellhead back pressure to maintain the bottom pressure stable. However, by adoption of this technology, the wellhead back pressure and auxiliary equipment thereof should be additionally configured, and the back pressure pump system has the defects of large size, too many corollary equipment, poor adaptability and high power consumption and requires a special power supply system, so that the operation cost of controlled pressure drilling is increased, and a large field space is occupied. In addition, the slurry pump or back pressure pump system cannot be repaired on the field when breaking down, so that continuous and stable pressure compensation cannot be realized, which leads to the interruption of controlled pressure drilling and restricts the development of the controlled pressure drilling technology.

At present, pressure control devices have been developed by relevant petroleum companies abroad. For example, the Weatherford micro-flow control system, which adopts an accurate sensor and a drilling fluid throttle mounted on a traditional drilling fluid circulating manifold, is not provided with back pressure compensation device, and realizes pressure control by monitoring the variation of inlet and outlet flow rates to change the throttling pressure. However, this system can only be used for controlled pressure drilling and unbalanced drilling with common requirements and is not suitable for full-course controlled pressure drilling under a narrow density window and a deep well. The DAPC system of At Balance is based on the same principle as the Weatherford micro-flow control system, is additionally provided with a back pressure compensation device, and can control the bottom pressure to be constant under the combined action of a wellhead throttling manifold and a back pressure pump. The back pressure pump is always in an inactive state. When the discharge quantity is very small or is zero, the back pressure pump applies a back pressure into the well through the throttling manifold. On the basis of this principle, the pressure control system of Halliburton is additionally provided with a safe overflow channel to improve the back pressure compensation function, so that the influence of pressure disturbance caused when the back pressure pump is started or stopped can be greatly reduced, continuous output of a reasonable back pressure is guaranteed, and full-condition switching between drilling, connecting and tripping is effectively realized.

SUMMARY

The technical issue to be settled by the invention is to provide a pressure compensation device with an accumulator group for controlled pressure drilling, which can pre-store drilling fluid from a horizontal pipe on a drilling rig and quickly release the drilling fluid during controlled pressure drilling to provide a hydraulic source to rapidly control the wellhead back pressure to realize continuous and stable pressure compensation.

The technical solution adopted by the invention to settle the aforesaid technical issue is as follows. A pressure compensation device with an accumulator group for controlled pressure drilling includes an electrical flat valve, a check valve, an accumulator group, a flanged pup joint and a support base. The electrical flat valve is connected to the check valve and is mounted on a top surface of the support base. The accumulator group mounted on the support base is a pre-storage pressure compensation device for controlled pressure drilling and is located at a downstream position of the check valve. A liquid inlet end of the accumulator group is connected to the check valve, and a liquid outlet end of the accumulator is connected to the flanged pup joint.

The accumulator group includes a frame, multiple bladder type accumulators, a liquid inlet flange, cartridge valve blocks, a liquid outlet flange, a protective cover, nitrogen measuring and filling pipes, nitrogen measuring and filling ports, a main liquid pipe, SAE flanges, connecting pipes, a pressure-measurement sensor interface, a liquid outlet pipe, a liquid pressure measurement pipe, air pressure gauges, nitrogen measuring and filling T-joints, nitrogen filling ports, a shock-proof pressure gauge, a liquid pressure-measurement sensor T-joint, and a pressure sensor. The accumulators are bladder type accumulators, the multiple bladder type accumulators are regularly mounted on the support base in two rows, are fixed by means of the frame, and are connected to the main liquid pipe through the cartridge valve blocks, the SAE flanges and the connecting pipes to form parallel liquid paths. The main liquid pipe has an end connected to the upstream check valve through the liquid inlet flange and an end connected to the downstream flanged pup joint through the liquid outlet end flange, and a diameter of the liquid inlet flange is smaller than a diameter of the liquid outlet flange. Upper portions of the cartridge valve blocks are respectively connected to the accumulators, and side surfaces of the cartridge valve blocks are communicated with the main liquid pipe through the SAE flanges and the connecting pipes. The connecting pipes are vertically connected to the main liquid pipe on the same horizontal plane, and a diameter of each of the connecting pipes is smaller than a diameter of the main liquid pipe. The liquid outlet pipe is located on the side surfaces of the cartridge valve blocks and is communicated with side outlets of the cartridge valve blocks. The nitrogen measuring and filling ports are respectively formed in tops of the accumulators and are respectively connected to the nitrogen measuring and filling T-joints on a surface plate of the protective cover, and the nitrogen measuring and filling T-joints are respectively communicated with the air pressure gauges and the nitrogen filling ports to measure a nitrogen pressure and supplement nitrogen. The pressure-measurement sensor interface is formed in the main liquid pipe and is connected to the liquid pressure-measurement sensor T-joint on the surface plate of the protective cover, the liquid pressure-measurement sensor T-joint is communicated with the shock-proof pressure gauge and the pressure sensor to measure and sense the pressure of drilling fluid in the main liquid pipe.

Drilling fluid stored in the accumulators is from a branched port of a horizontal pipe on a drilling jig.

The invention has the following beneficial effects: the problems that too many devices are used and the drilling fluid conversion efficiency is low when an independent back pressure pump is used to supplement drilling fluid to a wellhead control pipe during traditional controlled pressure drilling are effectively solved.

DESCRIPTION OF THE EMBODIMENTS

Figure 1:
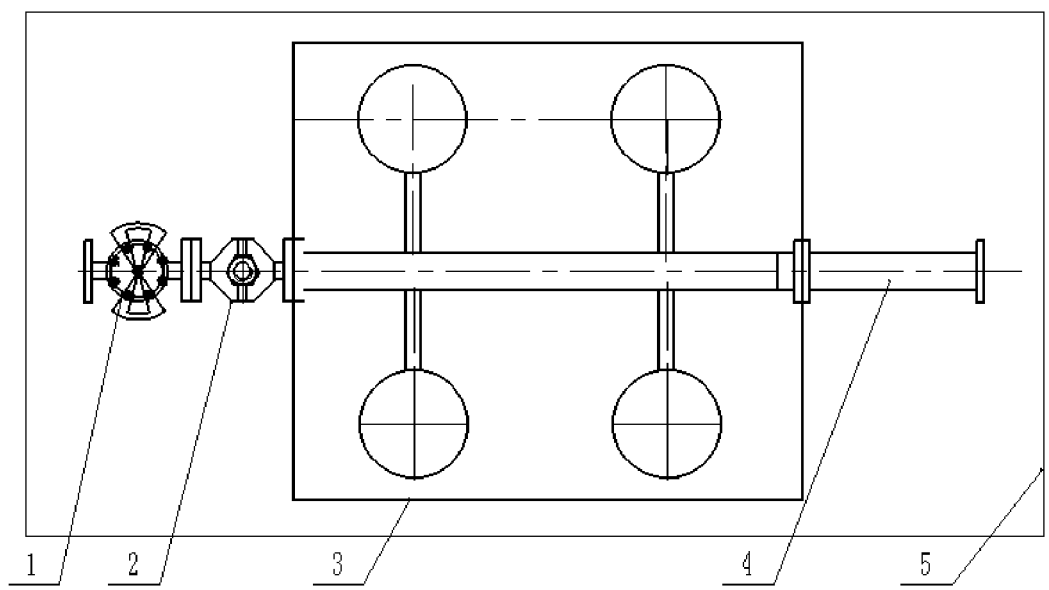
FIG. 1 is a structural view of a pressure compensation device with an accumulator group for controlled pressure drilling of the invention.

The invention will be further described below in conjunction with the accompanying drawings.

As shown in FIG. 1 to FIG. 4, the invention provides a pressure compensation device with an accumulator group for controlled pressure drilling, which comprises an electrical flat valve 1, a check valve 2, an accumulator group 3, a flanged pup joint 4 and a support base 5. The electrical flat valve 1 is connected to the check valve 2 and is mounted on the top surface of the support base 5, the accumulator group 3 mounted on the support base 5 is a pre-storage pressure compensation device for controlled pressure drilling and is located at a downstream position of the check valve 2, a liquid inlet end of the accumulator group 3 is connected to the check valve 2, and a liquid outlet end of the accumulator 3 is connected to the flanged pup joint 4.

The accumulator group 3 comprises a frame 3-1, multiple bladder type accumulators 3-2, a liquid inlet flange 3-3, cartridge valve blocks 3-4, a liquid outlet flange 3-5, a protective cover 3-6, nitrogen measuring and filling pipes 3-7, nitrogen measuring and filling ports 3-8, a main liquid pipe 3-9, SAE flanges 3-10, connecting pipes 3-11, a pressure-measurement sensor interface 3-12, a liquid outlet pipe 3-13, a liquid pressure measurement pipe 3-14, air pressure gauges 3-15, nitrogen measuring and filling T-joints 3-16, nitrogen filling ports 3-17, a shock-proof pressure gauge 3-18, a liquid pressure-measurement sensor T-joint 3-19, and a pressure sensor 3-20. The accumulators 3-2 are bladder type accumulators, the multiple bladder type accumulators are regularly mounted on the support base 5 in two rows, are fixed by means of the frame 1, and are connected to the main liquid pipe 3-9 through the cartridge valve blocks 3-4, the SAE flanges 3-10 and the connecting pipes 3-11 to form parallel liquid paths. One end of the main liquid pipe 3-9 is connected to the upstream check valve 2 through the liquid inlet flange 3-3, and the other end of the main liquid pipe 3-9 is connected to the downstream flanged pup joint 4 through the liquid outlet end flange. The diameter of the liquid inlet flange 3-3 is smaller than the diameter of the liquid outlet flange 3-5. Upper portions of the cartridge valve blocks 3-4 are respectively connected to the accumulators 3-2, and side surfaces of the cartridge valve blocks 3-4 are communicated with the main liquid pipe 3-9 through the SAE flanges 3-10 and the connecting pipes 3-11. The connecting pipes 3-11 are vertically connected to the main liquid pipe 3-9 on the same horizontal plane, and the diameter of each of the connecting pipes 3-11 is smaller than a diameter of the main liquid pipe 3-9. The liquid outlet pipe 3-13 is located on the side surfaces of the cartridge valve blocks 3-4 and is communicated with side outlets of the cartridge valve blocks 3-4. The nitrogen measuring and filling ports 3-8 are respectively formed in the tops of the accumulators and are respectively connected to the nitrogen measuring and filling T-joints 3-16 on a surface plate of the protective cover 3-6 through the nitrogen measuring and filling pipes 3-7, and the nitrogen measuring and filling T-joints 3-16 are respectively communicated with the air pressure gauges 3-15 and the nitrogen filling ports 3-17 to measure the nitrogen pressure and supplement nitrogen. The pressure-measurement sensor interface 3-12 is formed in the main liquid pipe 3-9 and is connected to the liquid pressure-measurement sensor T-joint 3-19 on the surface plate of the protective cover 3-6 through the liquid pressure measurement pipe 3-14, the liquid pressure-measurement sensor T-joint 3-19 is communicated with the shock-proof pressure gauge 3-18 and the pressure sensor 3-20 to measure and sense the pressure of drilling fluid in the main liquid pipe.

The drilling fluid stored in the accumulators is from a branched port of a horizontal pipe on a drilling rig.

According to the invention, the pressure compensation device pre-stores drilling fluid from a branched port of a horizontal pipe on a drilling rig through the electrical flat valve 1, the check valve 3 and the liquid inlet flange 3-3 which are opened in sequence, and releases the drilling fluid in the accumulator group to control it to flow to a wellhead pipe during controlled pressure drilling to control the wellhead back pressure.

Figure 2:
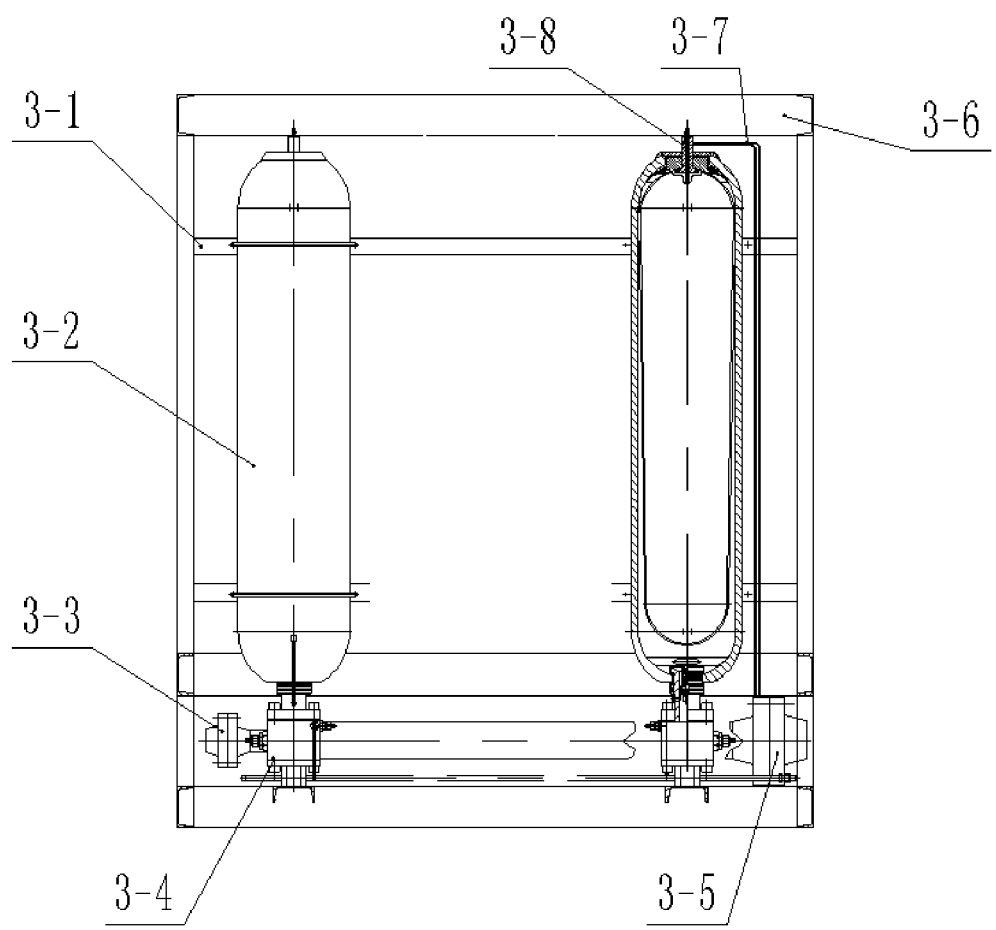
FIG. 2 is a front view of an accumulator group of the invention.
Figure 3:
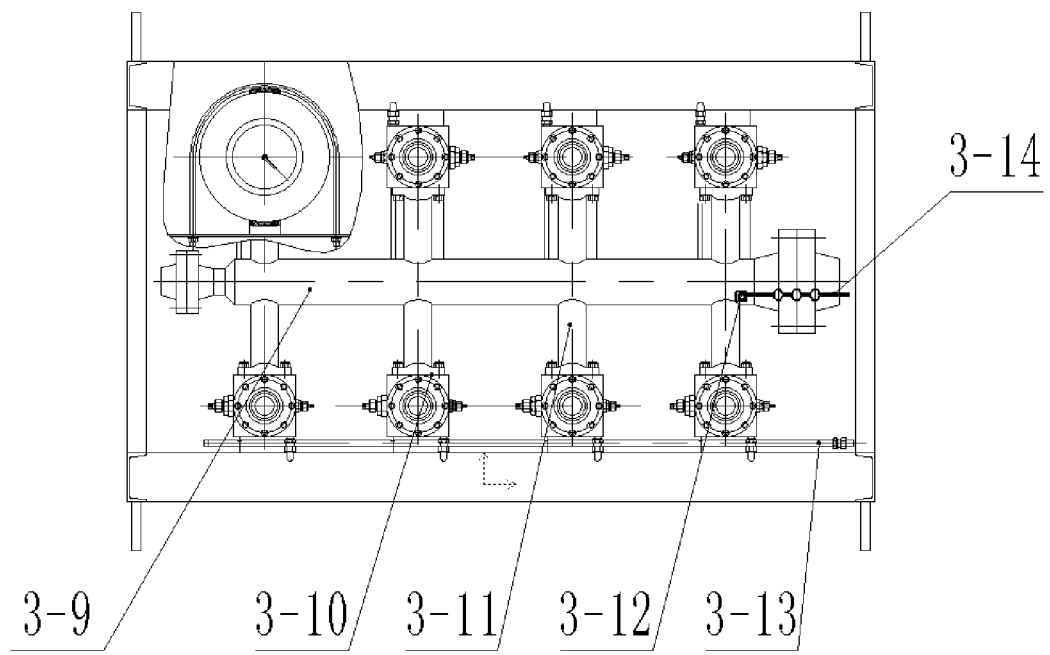
FIG. 3 is a top view of the accumulator group of the invention.

As shown in FIG. 2 and FIG. 3, the accumulators 3-2 are bladder type accumulators, and eight bladder type accumulators are regularly mounted on the support base 5 in two rows, are fixed by means of the frame 1, and are connected to the main liquid pipe 3-8 through the cartridge valve blocks 3-4, the SAE flanges 3-10 and the connecting pipes 3-11 to form parallel liquid paths. One end of the main liquid pipe 3-8 is connected to the upstream check valve 2 through the liquid inlet flange 3-3, and the other end of the main liquid pipe 3-8 is connected to the downstream flanged pup joint through the liquid outlet end flange. The diameter of the liquid inlet flange 3-3 is 43 mm, which is smaller than the diameter of the liquid outlet flange 3-5. The upper portions of the cartridge valve blocks 3-4 are connected to the accumulators 3-2, and the side surfaces of the cartridge valve blocks 3-4 are communicated with the main liquid pipe 3-8 through the SAE flanges 3-9 and the connecting pipes 3-10. The connecting pipes 3-11 are vertically connected to the main liquid pipe 3-9 on the same horizontal plane, and the diameter of each of the connecting pipes 3-11 is 56 mm, which is smaller than the diameter of the main liquid pipe 3-9. The liquid outlet pipe 3-13 is located on the side surfaces of the cartridge valve blocks 3-4 and is communicated with the side outlets of the cartridge valve blocks 3-4.

Figure 4:
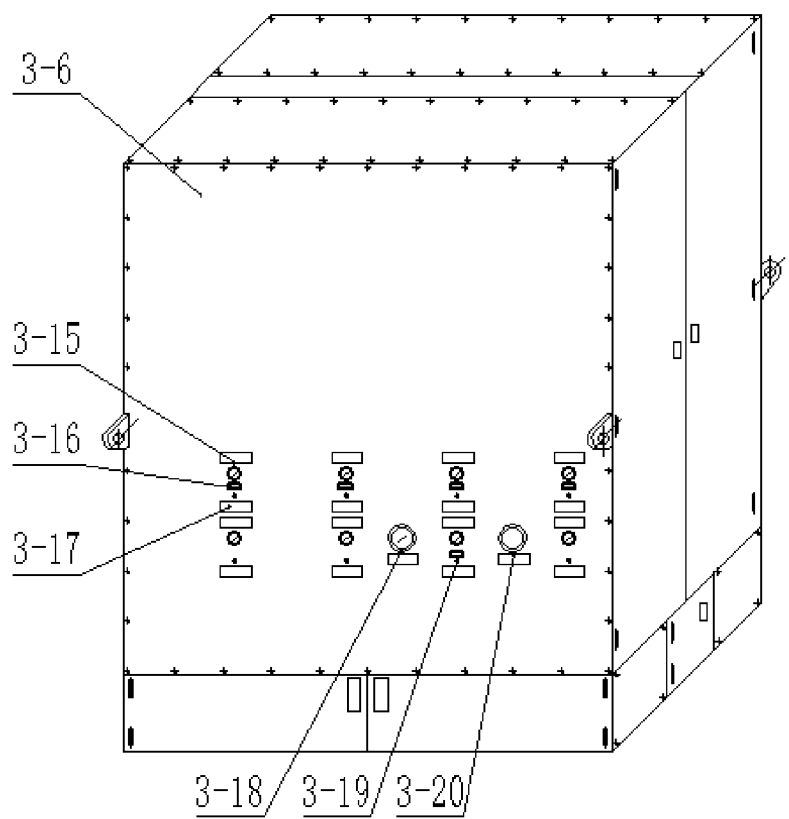
FIG. 4 is a side view of the accumulator group of the invention.

As shown in FIG. 4, the nitrogen measuring and filling ports 3-8 are respectively formed in the tops of the accumulators and are respectively connected to the nitrogen measuring and filling T-joints 3-16 on the surface plate of the protective cover 3-6 through the nitrogen measuring and filling pipes 3-7, and the nitrogen measuring and filling T-joints 3-16 are respectively communicated with the air pressure gauges 3-15 and the nitrogen filling ports 3-17 to measure the nitrogen pressure and supplement nitrogen. The pressure-measurement sensor interface 3-12 is formed in the main liquid pipe 3-9 and is connected to the liquid pressure-measurement sensor T-joint 3-19 on the surface plate of the protective cover 3-6 through the liquid pressure measurement pipe 3-14, and the liquid pressure-measurement sensor T-joint 3-19 is communicated with the shock-proof pressure gauge 3-18 and the pressure sensor 3-20 to measure and sense the pressure of drilling fluid in the main liquid pipe.

After use, residual drilling fluid is discharged through the liquid outlet pipe 3-13.

Specifically, the accumulator group of the invention is mounted on the support base through the cartridge valve blocks. The accumulators in the accumulator group are divided into two rows and are all communicated with the main liquid pipe to form parallel liquid paths for pre-storing drilling fluid. Each accumulator can be separately controlled to open or close and thus will not affect the operation of other accumulators. The liquid inlet flange at one end of the main liquid pipe is communicated with the upstream check valve to form a liquid inlet end which receives drilling fluid from a branched port of a horizontal pipe on a drilling rig and stores the drilling fluid in the accumulator group, and the liquid outlet flange at the other end of the main liquid pipe is communicated with the flange pup joint to form a liquid outlet end, and the diameter of the liquid inlet end is smaller than the diameter of the liquid outlet end. The liquid outlet pipe is used to discharge residual drilling fluid from the accumulators, the shock-proof pressure gauge and an input terminal of the pressure sensor for measuring the pressure of liquid in the main liquid pipe are mounted on the main liquid pipe, input ports for measuring the pressure of nitrogen in capsules of the accumulator group and filling nitrogen into the capsules are formed in the tops of the accumulators, and output ports are formed in the side surface of the protective cover to facilitate direct observation. The protective cover is mounted outside the accumulator group to protect and isolate the accumulator group.

The frame is made of angle iron and is mounted on the periphery of the accumulator group to support and fix the accumulator group. The nitrogen measuring and filling ports are formed in the tops of the accumulators, and the nitrogen measuring and filling pipes and the nitrogen measuring and filling T-joints are used to measure the nitrogen pressure in the capsules of the accumulators and fill nitrogen into the capsules. The liquid pressure-measurement sensor interface is mounted on the main liquid pipe, is connected to the shock-proof hydraulic pressure gauge and the pressure sensor through the liquid pressure-measurement sensor pipe and the liquid pressure measuring sensor T-joint to measure the pressure of liquid in the main liquid pipe, and is mounted on the outer side of the protective cover to facilitate direct observation. The protective cover is a cuboid steel shell mounted outside the accumulator group and is used to protect and isolate the accumulator group.

When the pressure compensation device with the accumulator group for controlled pressure drilling works, the electrical flat valve 1 on the upstream position of the accumulator group 3 is opened to allow drilling fluid from the branched port of the horizontal pipe on a drilling jig to enter the eight accumulators 3-2, connected in parallel with the main liquid pipe 3-9, through the check valve 2, and the drilling fluid is stored in the accumulator group. When controlled pressure drilling is carried out, the drilling fluid stored in the accumulator group is released to controllably flow to a wellhead pipe to control the wellhead back pressure. The pressure value of the drilling fluid displayed on the shock-proof pressure gauge 3-18 is observed, and when the pressure of the drilling fluid released from the accumulator group is lower than a set value, the electrical flat valve 1 is opened again to supplement and store drilling fluid. The pressure value on the air pressure gauges 3-15 is observed, and when the pressure value is lower than a set value, nitrogen is supplemented through the nitrogen filling ports 3-17 until the pressure value reaches the set value.

The aforesaid description is merely used to explain preferred implementations of the invention. It should be noted that different improvements and embellishments can be made by those ordinarily skilled in the art without departing from the principle of the invention, and all these improvements and embellishments should also fall within the protection scope of the invention.

What is claimed is:

1. A pressure compensation device with an accumulator group for controlled pressure drilling, the pressure compensation device comprising an electrical flat valve, a check valve, an accumulator group, a flanged pup joint and a support base, wherein the electrical flat valve is connected to the check valve and is mounted on a top surface of the support base, the accumulator group mounted on the support base is a pre-storage pressure compensation device for controlled pressure drilling and is located at a downstream position of the check valve, a liquid inlet end of the accumulator group is connected to the check valve, and a liquid outlet end of the accumulator is connected to the flanged pup joint, wherein the accumulator group comprises a frame, multiple bladder type accumulators, a liquid inlet flange, cartridge valve blocks, a liquid outlet flange, a protective cover, nitrogen measuring and filling pipes, nitrogen measuring and filling ports, a main liquid pipe, Society of Automotive Engineers (SAE) flanges, connecting pipes, a pressure-measurement sensor interface, a liquid outlet pipe, a liquid pressure measurement pipe, air pressure gauges, nitrogen measuring and filling T-joints, nitrogen filling ports, a shock-proof pressure gauge, a liquid pressure-measurement sensor T-joint, and a pressure sensor;

the accumulators are bladder type accumulators, the multiple bladder type accumulators are regularly mounted on the support base in two rows, are fixed by the frame, and are connected to the main liquid pipe through the cartridge valve blocks, the SAE flanges and the connecting pipes to form parallel liquid paths;

the main liquid pipe has an end connected to the upstream check valve through the liquid inlet flange and another end connected to the downstream flanged pup joint through the liquid outlet end flange, and a diameter of the liquid inlet flange is smaller than a diameter of the liquid outlet flange;

upper portions of the cartridge valve blocks are respectively connected to the accumulators, and side surfaces of the cartridge valve blocks are communicated with the main liquid pipe through the SAE flanges and the connecting pipes; the connecting pipes are vertically connected to the main liquid pipe on a same horizontal plane, and a diameter of each of the connecting pipes is smaller than a diameter of the main liquid pipe;

the liquid outlet pipe is located on the side surfaces of the cartridge valve blocks and is communicated with side outlets of the cartridge valve blocks; the nitrogen measuring and filling ports are respectively formed in tops of the accumulators and are respectively connected to the nitrogen measuring and filling T-joints on a surface plate of the protective cover through the nitrogen measuring and filling pipes, and the nitrogen measuring and filling T-joints are respectively communicated with the air pressure gauges and the nitrogen filling ports to measure a nitrogen pressure and supplement nitrogen;

the pressure-measurement sensor interface is formed in the main liquid pipe and is connected to the liquid pressure-measurement sensor T-joint on the surface plate of the protective cover through the liquid pressure measurement pipe, the liquid pressure-measurement sensor T-joint is communicated with the shock-proof pressure gauge and the pressure sensor to measure and sense a pressure of drilling fluid in the main liquid pipe.

2. The pressure compensation device with an accumulator group for controlled pressure drilling according to claim 1, wherein the electrical flat valve is connected to a branched port of a horizontal pipe on a drilling jig.

\* \* \* \* \*